(12) United States Patent
Ono et al.

(10) Patent No.: US 10,483,047 B2
(45) Date of Patent: Nov. 19, 2019

(54) ELECTROCHEMICAL REACTION DEVICE

(71) Applicant: KABUSHIKI KAISHA TOSHIBA, Minato-ku (JP)

(72) Inventors: Akihiko Ono, Kita (JP); Satoshi Mikoshiba, Yamato (JP); Ryota Kitagawa, Setagaya (JP); Jun Tamura, Chuo (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/395,371

(22) Filed: Apr. 26, 2019

(65) Prior Publication Data

US 2019/0252128 A1 Aug. 15, 2019

Related U.S. Application Data

(63) Continuation of application No. 15/261,473, filed on Sep. 9, 2016.

(30) Foreign Application Priority Data

Mar. 18, 2016 (JP) .................. 2016-054731
Sep. 8, 2016 (JP) .................. 2016-175194

(51) Int. Cl.
*H01G 9/20* (2006.01)
*C25B 13/08* (2006.01)
(Continued)

(52) U.S. Cl.
CPC ........... *H01G 9/2013* (2013.01); *C25B 1/003* (2013.01); *C25B 1/04* (2013.01); *C25B 3/04* (2013.01);
(Continued)

(58) Field of Classification Search
CPC ........ H01G 9/2013; C25B 1/003; C25B 1/04; C25B 3/04; C25B 13/08; C25B 15/02; Y02E 60/366
See application file for complete search history.

(56) References Cited

U.S. PATENT DOCUMENTS 3,214,357 A 10/1965 Holt et al.
3,497,430 A 2/1970 French et al.
(Continued)

FOREIGN PATENT DOCUMENTS

JP  S59-152389 A  8/1984
JP  64-39391      2/1989
(Continued)

OTHER PUBLICATIONS

Steven Y. Reece et al. "Wireless Solar Water Splitting Using Silicon-Based Semiconductors and Earth-Abundant Catalysts" Science vol. 334: Nov. 4, 2011, 5 pages.

*Primary Examiner* — Ciel P Thomas
(74) *Attorney, Agent, or Firm* — Oblon, McClelland, Maier & Neustadt, L.L.P.

(57) ABSTRACT

An electrochemical reaction device includes: an electrolytic solution tank including a first storage part storing a first electrolytic solution and a second storage part storing a second electrolytic solution; a reduction electrode immersed in the first electrolytic solution; and an oxidation electrode immersed in the second electrolytic solution. The second electrolytic solution contains a substance to be oxidized. The first electrolytic solution has a first liquid phase containing water and a second liquid phase containing an organic solvent and being in contact with the first liquid phase. At least one liquid phase of the first liquid phase or the second liquid phase contains a substance to be reduced and is in contact with the reduction electrode.

14 Claims, 6 Drawing Sheets

(51) Int. Cl.
 *C25B 15/02* (2006.01)
 *C25B 1/04* (2006.01)
 *C25B 3/04* (2006.01)
 *C25B 1/00* (2006.01)
(52) U.S. Cl.
 CPC .............. C25B 13/08 (2013.01); C25B 15/02 (2013.01); *Y02E 60/366* (2013.01)

(56) References Cited

U.S. PATENT DOCUMENTS

| | | |
|---|---|---|
| 3,689,372 A | 9/1972 | Fox et al. |
| 2013/0199937 A1 | 8/2013 | Cole et al. |

FOREIGN PATENT DOCUMENTS

| | | |
|---|---|---|
| JP | 5-61355 | 3/1993 |
| JP | 2011-94194 | 5/2011 |
| JP | 2015-218380 A | 12/2015 |
| JP | 2013-95995 A | 5/2019 |

ELECTROCHEMICAL REACTION DEVICE

CROSS-REFERENCE TO RELATED APPLICATION

This is a continuation of U.S. application Ser. No. 15/261,473, filed on Sep. 9, 2016, which is based upon and claims the benefit of priority from Japanese Patent Applications No. 2016-054731, filed on Mar. 18, 2016 and No. 2016-175194, filed on Sep. 8, 2016; the entire contents of all of which are incorporated herein by reference.

FIELD

Embodiments described herein relate generally to an electrochemical reaction device.

BACKGROUND

In recent years, a development in an artificial photosynthesis technology of electrochemically converting sunlight into a chemical substance in imitation of photosynthesis of plants is in progress from viewpoints of an energy problem and an environmental problem. That is because, for example, energy can be obtained sufficiently even if the sunlight is converted into the chemical substance in land such as desert whose utilization value is low and which is not utilized for producing plants and the chemical substance is transported to a distant place. The case of converting the sunlight into the chemical substance and storing it in a cylinder or tank has advantages that the storage cost of the energy can be reduced and the storage loss is small as compared with the case of converting the sunlight into electricity and storing it in storage batteries.

As a photoelectrochemical reaction device which electrochemically converts sunlight into a chemical substance, there has been known, for example, a two-electrode type device which includes an electrode having a reduction catalyst for reducing carbon dioxide and an electrode having an oxidation catalyst for oxidizing water ($H_2O$), and in which these electrodes are immersed in water in which carbon dioxide is dissolved. At this time, the electrodes are electrically connected to each other via an electric wire or the like. In the electrode having the oxidation catalyst, $H_2O$ is oxidized by light energy, and thereby oxygen ($1/2O_2$) is obtained and a potential is obtained. In the electrode having the reduction catalyst, by obtaining the potential from the electrode in which the oxidation reaction is caused, carbon dioxide is reduced and formic acid (HCOOH) or the like is produced. Thus, in the two-electrode type device, since a reduction potential of carbon dioxide is obtained by two-stage excitation, conversion efficiency from the sunlight to chemical energy is low.

DETAILED DESCRIPTION

An electrochemical reaction device of an embodiment includes: an electrolytic solution tank including a first storage part storing a first electrolytic solution and a second storage part storing a second electrolytic solution; a reduction electrode immersed in the first electrolytic solution; and an oxidation electrode immersed in the second electrolytic solution. The second electrolytic solution contains a substance to be oxidized. The first electrolytic solution has a first liquid phase containing water and a second liquid phase containing an organic solvent and being in contact with the first liquid phase. At least one liquid phase of the first liquid phase or the second liquid phase contains a substance to be reduced and is in contact with the reduction electrode Hereinafter, the embodiment will be described with reference to the drawings. Note that the drawings are schematic, and for example, sizes such as a thickness and a width of each component are sometimes different from actual sizes of the component. Further, in the embodiment, substantially the same components are denoted by the same reference signs, and a description is sometimes omitted. A term of "connect" in this description may include a meaning of indirectly connecting without limiting to that of directly connecting.

Figure 1:
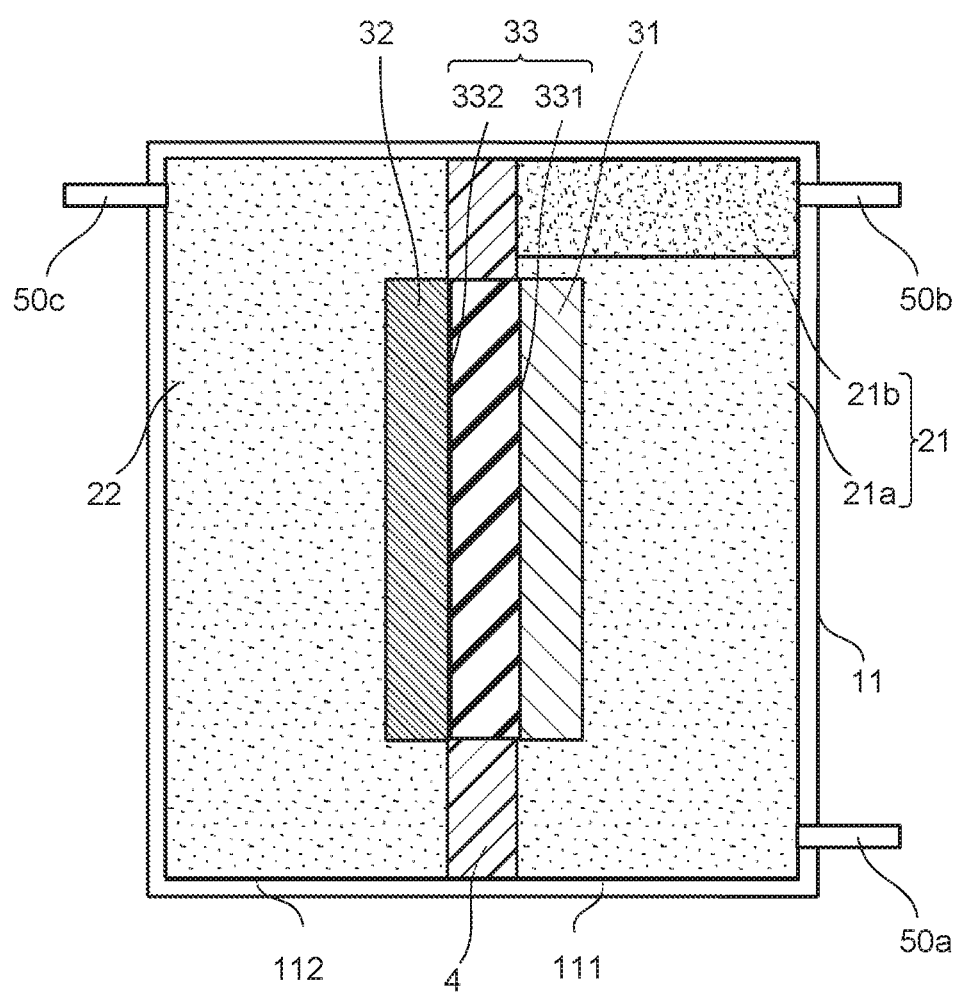
FIG. 1 is a schematic view illustrating a structure example of an electrochemical reaction device.

FIG. 1 is a schematic view illustrating a structure example of an electrochemical reaction device. The electrochemical reaction device includes an electrolytic solution tank 11, a reduction electrode 31, an oxidation electrode 32, a photoelectric conversion body 33, an ion exchange membrane 4, and flow paths 50a to 50c as illustrated in FIG. 1.

The electrolytic solution tank 11 has a storage part 111 and a storage part 112. A shape of the electrolytic solution tank 11 is not particularly limited as long as it is a three-dimensional shape having a cavity which becomes the storage parts. Examples of a material of the electrolytic solution tank 11 include a material which transmits light is used.

The storage part 111 stores an electrolytic solution 21 containing a substance to be reduced. The substance to be reduced is a substance which is reduced by a reduction reaction. The substance to be reduced contains, for example, carbon dioxide. Further, the substance to be reduced may contain hydrogen ions. Changing an amount of water and an electrolytic solution component which are contained in the electrolytic solution 21 makes it possible to change reactivity and change selectivity of the substance to be reduced and a rate of a chemical substance to be produced.

Furthermore, the electrolytic solution 21 has a liquid phase 21a containing water and a liquid phase 21b containing an organic solvent and being in contact with the liquid phase 21a. At least one liquid phase of the liquid phase 21a and the liquid phase 21b contains the above-described substance to be reduced and is in contact with the reduction electrode 31.

The storage part 112 stores an electrolytic solution 22 containing a substance to be oxidized. The substance to be oxidized is a substance which is oxidized by an oxidation reaction. The substance to be oxidized is water, organic matter such as alcohol or amine, or an inorganic oxide such as iron oxide, for example. The same substance as that in the electrolytic solution 21 may be contained in the electrolytic solution 22. In this case, the electrolytic solution 21 and the electrolytic solution 22 may be regarded as one electrolytic solution.

A pH value of the electrolytic solution 22 is preferably higher than a pH value of the electrolytic solution 21. This makes the hydrogen ions, hydroxide ions, and the like easily move. Further, it is possible to make the oxidation-reduction reaction progress effectively owing to a liquid junction potential caused by a difference between the pH values.

Examples of the liquid phase 21a of the electrolytic solution 21 include an aqueous solution containing $LiHCO_3$, $NaHCO_3$, $KHCO_3$, $CsHCO_3$, phosphate, borate, or the like may be used. The liquid phase 21a may contain alcohols such as methanol, ethanol, acetone, or the like. The liquid phase 21a may be the same as the electrolytic solution 22. However, an absorption amount of carbon dioxide in the electrolytic solution containing carbon dioxide is preferably high. Accordingly, a solution different from the electrolytic solution containing water may be used as the electrolytic solution containing carbon dioxide. The electrolytic solution containing carbon dioxide is preferably an electrolytic solution which lowers a reduction potential of carbon dioxide, has high ionic conductivity, and contains a carbon dioxide absorbent which absorbs carbon dioxide.

Examples of the liquid phase 21a include an ionic liquid which is made of salts of cations such as imidazolium ions or pyridinium ions and anions such as $BF_4^-$ or $PF_6^-$ and which is in a liquid state in a wide temperature range, or its aqueous solution can be used. Other examples of electrolytic solution include amine solutions of ethanolamine, imidazole, and pyridine, or aqueous solutions thereof. Examples of amine include primary amine, secondary amine, tertiary amine, and the like. These electrolytic solutions may have properties of having the high ionic conductivity and absorbing carbon dioxide and have a characteristic of lowering reduction energy.

Examples of the primary amine include methylamine, ethylamine, propylamine, butylamine, pentylamine, hexylamine, and the like. Hydrocarbons of the amine may be substituted by alcohol, halogen, or the like. Examples of the amine whose hydrocarbons are substituted include methanolamine, ethanolamine, chloromethyl amine, and so on. Further, an unsaturated bond may exist. These hydrocarbons are the same in the secondary amine and the tertiary amine.

Examples of the secondary amine include dimethylamine, diethylamine, dipropylamine, dibutylamine, dipentylamine, dihexylamine, dimethanolamime, diethanolamine, dipropanolamine, and so on. The substituted hydrocarbons may be different. This also applies to the tertiary amine. Examples in which the hydrocarbons are different include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, methyldipropylamine, and so on.

Examples of the cations of the ionic liquid include a 1-ethyl-3-methylimidazolium ion, a 1-methyl-3-propylimidazolium ion, a 1-butyl-3-methylimidazole ion, a 1-methyl-3-pentylimidazolium ion, a 1-hexyl-3-methylimidazolium ion, and so on.

A second place of imidazolium ions may be substituted. Examples of the cations having the imidazolium ion in which the second place is substituted include a 1-ethyl-2,3-dimethylimidazolium ion, a 1,2-dimethyl-3-propylimidazolium ion, a 1-butyl-2,3-dimethylimidazolium ion, a 1,2-dimethyl-3-pentylimidazolium ion, a 1-hexyl-2,3-dimethylimidazolium ion, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist. Imidazolium molecules or pyridinium molecules may be bonded each other using ethylene glycol chains. For example, a organic compound expressed by a formula $[PEG_m(mim)_2]$ (m=10 to 10000) is used. PEG is poly ethylene glycol. Mim is methylimidazolium.

Examples of the anion include a fluoride ion, a chloride ion, a bromide ion, a iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, bis(trifluoromethanesulfonyl)imide, and so on. A dipolar ion in which the cation and the anion of the ionic liquid are coupled by hydrocarbons may be used. Note that a buffer solution such as a potassium phosphate solution may be supplied to the storage parts 111, 112.

Examples of the organic solvent of the liquid phase 21b include toluene, benzene, octane, octanol, dimethylformamide, hexane, xylene, chlorobenzene, ethyl acetate, chloroethylene, dichloroethylene, acetic acid, formalin, formic acid, acetaldehyde, tetrahydrofuran, cyclohexane, methanol, ethanol, ethylene glycol, glyoxal, acetonitrile, methyl acetate, ethyl methyl ketone, dimethyl ether, acetone, diethyl ether, chloroform, methylene chloride, dimethyl sulfoxide (DMSO), dimethyl disulfide (DMDS), and an aprotic solvent include hexamethylphosphoric triamide (HMPA), N,N'-dimethylpropyleneurea (DMPU), and so on, and examples of element substance or a mixture thereof can be used. Note that when a hydrophilic organic solvent is used, it is preferably used by, for example, being combined with another hydrophobic organic solvent so as to separate the liquid phase 21b and the liquid phase 21a. Note that when the liquid phase 21b contains the substances to be reduced, it may contain an electrolytic solution applicable to the above-described liquid phase 21a in addition to the organic solvent. Examples of the organic solvent include an ionic liquid.

Examples of the electrolytic solution 22 include an aqueous solution containing an arbitrary electrolyte. Examples of the aqueous solution containing the electrolyte include an aqueous solution containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), and so on. Further, when the electrolytic solution 22 contains carbon dioxide, an electrolytic solution applicable to the liquid phase 21a may be used.

The reduction electrode 31 is immersed in the electrolytic solution 21 so as to be in contact with at least one liquid phase of the liquid phase 21a and the liquid phase 21b. The reduction electrode 31 illustrated in FIG. 1 is in contact with the liquid phase 21a. The reduction electrode 31 contains, for example, a reduction catalyst for the substance to be reduced. The reduction catalyst is preferably in contact with at least one of the above-described liquid phases. A compound to be produced by the reduction reaction is different depending on the kind and the like of the reduction catalyst. The compound to be produced by the reduction reaction is, for example, a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), or ethylene glycol, or hydrogen.

The reduction electrode 31 may have a structure in, for example, a thin-film shape, a lattice shape, a granular shape, or a wire shape. The reduction catalyst need not necessarily be provided in the reduction electrode 31. A reduction catalyst provided besides the reduction electrode 31 may be electrically connected to the reduction electrode 31.

The oxidation electrode 32 is immersed in the electrolytic solution 22. The oxidation electrode 32 contains, for example, an oxidation catalyst for the substance to be oxidized. A compound to be produced by the oxidation reaction is different depending on the kind and the like of the oxidation catalyst. The compound to be produced by the oxidation reaction is, for example, hydrogen ions.

The oxidation electrode 32 may have a structure in, for example, a thin-film shape, a lattice shape, a granular shape, or a wire shape. The oxidation catalyst need not necessarily be provided in the oxidation electrode 32. An oxidation catalyst provided besides the oxidation electrode 32 may be electrically connected to the oxidation electrode 32.

When the oxidation electrode 32 is stacked on the photoelectric conversion body 33 and is immersed in the electrolytic solution 22 and when the oxidation-reduction reaction is performed by irradiating the photoelectric conversion body 33 with light via the oxidation electrode 32, the oxidation electrode 32 is necessary to have a light transmitting property. A transmittance of the light through the oxidation electrode 32 is preferably at least 10% or more, more preferably 30% or more of an irradiation amount of the light irradiated on the oxidation electrode 32, for example. Without limiting to the above, the light may be irradiated on the photoelectric conversion body 33 via the reduction electrode 31, for example.

The smaller an interval between the reduction electrode 31 and the oxidation electrode 32 is, the higher ion diffusion efficiency is. Accordingly, the reduction electrode 31 preferably faces the oxidation electrode 32. At this time, it is preferable that the electrode on a light-receiving side is disposed to be vertical to incident light and the electrode on a side opposite to the light-receiving side is disposed to be parallel to the incident light.

The photoelectric conversion body 33 has a face 331 electrically connected to the reduction electrode 31 and a face 332 electrically connected to the oxidation electrode 32. Note that the photoelectric conversion body 33 need not necessarily be provided, and another generator may be connected to the oxidation electrode 32 and the reduction electrode 31. The generator is not limited to the photoelectric conversion element having the photoelectric conversion body. Examples of the generator include a system power supply, a storage battery, or the renewable energy such as the wind power, water power, and the geothermal power. The reduction electrode 31, the oxidation electrode 32, and the photoelectric conversion body 33 are stacked. The reduction electrode 31 is in contact with the face 331, and the oxidation electrode 32 is in contact with the face 332. At this time, a stack including the reduction electrode 31, the oxidation electrode 32, and the photoelectric conversion body 33 is also referred to as a photoelectric conversion cell. The photoelectric conversion cell penetrates the ion exchange membrane 4 and is immersed in the electrolytic solution 21 and the electrolytic solution 22.

The photoelectric conversion body 33 has a function of performing charge separation by energy of the irradiated light such as sunlight. Electrons generated by the charge separation move to the reduction electrode side, and holes move to the oxidation electrode side. This allows the photoelectric conversion body 33 to generate electromotive force. Examples of the photoelectric conversion body 33 include a photoelectric conversion body of a pn-junction type or a pin-junction type can be used. The photoelectric conversion body 33 may be fixed to, for example, the electrolytic solution tank 11. Note that the photoelectric conversion body 33 may be formed by stacking a plurality of photoelectric conversion layers. Sizes of the reduction electrode 31, the oxidation electrode 32, and the photoelectric conversion body 33 may be different from one another.

The ion exchange membrane 4 is provided to divide the storage part 111 and the storage part 112. The ion exchange membrane 4 allows specific ions to pass therethrough. Examples of the ion exchange membrane 4 include Neosepta (registered trademark) of Astom Corporation, Selemion (registered trademark), Aciplex (registered trademark) of Asahi Glass Corporation, Ltd., Fumasep (registered trademark), fumapem (registered trademark) of Fumatech Corporation, Nafion (registered trademark) of Dupont Corporation which is a fluorocarbon resin in which tetrafluoroethylene is sulfonated and polymerized, lewabrane (registered trademark) of LANXESS Corporation, IONSEP (registered trademark) of IONTECH Corporation, Mustang (registered trademark) of PALL Corporation, ralex (registered trademark) of mega Corporation, Gore-Tex (registered trademark) of Gore-Tex Corporation, and so on. Further, the ion exchange membrane may be formed by using a membrane whose basic structure is hydrocarbon or a membrane having an amine group in anion exchange.

When the ion exchange membrane 4 is, for example, a proton exchange membrane, hydrogen ions can migrate to the electrolytic solution 21 side. Using an ion exchange membrane which is a solid polymer membrane such as Nafion makes it possible to increase migration efficiency of the ions. Note that the ion exchange membrane 4 need not necessarily be provided, and a salt bridge such as agar may be provided instead of the ion exchange membrane 4.

The flow path 50a connects the liquid phase 21a and the outside of the electrolytic solution tank 11. The flow path 50a is a flow path for recovering a product produced by the reduction reaction and contained in the liquid phase 21a. Note that a shape of the flow path 50a is not particularly limited as long as it is a shape having a cavity such as a pipe. Further, different recovery flow paths may be provided for each kind of the products. Further, the product may be extracted and recovered by connecting the flow path 50a to a still or providing a separation membrane and the like in the flow path 50a. Furthermore, a flow path for sending the liquid phase 21b in or out may be provided besides the flow path 50b. Furthermore, a flow path for sending the liquid phase 21a in or out may be provided besides the flow path 50a.

The flow path 50b connects the liquid phase 21b and the outside of the electrolytic solution tank 11. The flow path 50b is a flow path for recovering a product produced by the reduction reaction and contained in the liquid phase 21b. A shape of the flow path 50b is not particularly limited as long as it is the shape having the cavity such as the pipe. Further, the product may be extracted and recovered by connecting the flow path 50b to a still or providing a separation membrane and the like in the flow path 50b. Furthermore, the flow path for sending the liquid phase 21b in or out may be provided besides the flow path 50b.

The flow path 50c connects the electrolytic solution 22 and the outside of the electrolytic solution tank 11. The flow path 50c is a flow path for recovering a product produced by the oxidation reaction and contained in the electrolytic solution 22. Further, the product may be extracted and recovered by connecting the flow path 50c to a still or providing a separation membrane and the like in the flow path 50c. Furthermore, the flow path for sending the liquid phase 21b in or out may be provided besides the flow path 50b. A shape of the flow path 50c is not particularly limited as long as it is the shape having the cavity such as the pipe.

Next, an operation example of the electrochemical reaction device illustrated in FIG. 1 will be described. When light is incident on the photoelectric conversion body 33, the photoelectric conversion body 33 generates photoexcited electrons and the holes. At this time, the photoexcited electrons gather on the reduction electrode 31 and the holes gather on the oxidation electrode 32. This causes the electromotive force in the photoelectric conversion body 33. As the light, the sunlight is preferable, but light of light-emitting diode, organic EL, or the like may be made incident on the photoelectric conversion body 33.

A case where an electrolytic solution containing water and carbon dioxide is used as the liquid phase 21a of the electrolytic solution 21 and the electrolytic solution 22 to produce carbon monoxide will be described. In the vicinity of the oxidation electrode 32, the oxidation reaction of water occurs as in the following formula (1), electrons are lost, and oxygen and hydrogen ions are produced. At least one of the produced hydrogen ions migrates via the ion exchange membrane 4 to the storage part 111.

$$2H_2O \rightarrow 4H^+ + O_2 + 4e^- \quad (1)$$

In the vicinity of the reduction electrode 31, the reduction reaction of carbon dioxide occurs as in the following formula (2), the hydrogen ions react with carbon dioxide while receiving electrons and carbon monoxide and water are produced. Further, the hydrogen ions receive the electrons as in the following formula (3), and thereby hydrogen is produced. At this time, hydrogen may be produced simultaneously with carbon monoxide.

$$CO_2 + 2H^+ + 2e^- \rightarrow CO + H_2O \quad (2)$$

$$2H^+ + 2e^- \rightarrow H_2 \quad (3)$$

The photoelectric conversion body 33 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in the formula (1) is 1.23 [V]. The standard oxidation-reduction potential of the reduction reaction in the formula (2) is 0.03 [V]. The standard oxidation-reduction potential of the reduction reaction in the formula (3) is "0" (zero) [V]. At this time, the open-circuit voltage needs setting to 1.26 [V] or more in the reactions in the formula (1) and the formula (2).

The open-circuit voltage of the photoelectric conversion body 33 is preferably set higher than the potential difference between the standard oxidation-reduction potential of the oxidation reaction and the standard oxidation-reduction potential of the reduction reaction by an overvoltage value or more. For example, the overvoltages of the oxidation reaction in the formula (1) and the reduction reaction in the formula (2) are both 0.2 [V]. In the reactions in the formula (1) and the formula (2), the open-circuit voltage is preferably set to 1.66 [V] or more. Similarly in the reactions in the formula (1) and the formula (3), the open-circuit voltage is preferably set to 1.63 [V] or more.

The reduction reactions of the hydrogen ions and carbon dioxide are reactions in which the hydrogen ions are consumed. Accordingly, when an amount of the hydrogen ions is small, efficiency of the reduction reactions decreases. Consequently, it is preferable that a concentration of the hydrogen ions is made different between the electrolytic solution 21 and the electrolytic solution 22 and the concentration difference makes the hydrogen ions migrate easily. Concentrations of anions (for example, hydroxide ions and the like) may be made different between the electrolytic solution 21 and the electrolytic solution 22. When a cation-exchange membrane is used as the ion exchange membrane, cations are made migrate, and when an anion-exchange membrane is used as the ion exchange membrane, the anions are made migrate. Further, in order to increase the concentration difference in the hydrogen ions, there can be considered a method, in which inert gas (nitrogen, argon, and the like) not containing carbon dioxide is, for example, directly blown in the electrolytic solution 22, thereby releasing carbon dioxide contained in the electrolytic solution 22, which decreases the hydrogen ion concentration in the electrolytic solution 22.

Reaction efficiency in the formula (2) varies according to a concentration of carbon dioxide dissolved in the electrolytic solution. The higher the carbon dioxide concentration is, the higher the reaction efficiency is, and the lower the carbon dioxide concentration is, the lower the reaction efficiency is. The reaction efficiency in the formula (2) varies also according to a concentration of hydrogen carbonate ions or carbonate ions. However, the hydrogen carbonate ion concentration or the carbonate ion concentration is made regulate more easily than the carbon dioxide concentration because they can be regulated by increasing an electrolytic solution concentration or regulating the pH value. Note that even if the ion exchange membrane 4 is provided between the oxidation electrode and the reduction electrode, carbon dioxide gas, the carbonate ions, the hydrogen carbonate ions, or the like passes through the ion exchange membrane 4, so that it is difficult to completely prevent performance decrease. Examples of a method of increasing the carbon dioxide concentration include a method of blowing carbon dioxide directly in the electrolytic solution 21 can be considered. At this time, providing a porous layer in the electrolytic solution 21 and supplying carbon dioxide via the porous layer make it possible to increase the carbon dioxide concentration in the electrolytic solution 21.

In the electrochemical reaction device of this embodiment, the electrolytic solution 21 has the liquid phase 21a containing water and the liquid phase 21b containing the organic solvent. When the liquid phase 21a is in contact with the reduction electrode 31, the product to be produced by the reduction reaction dissolves in the liquid phase 21a. The above-described product in the liquid phase 21a can move to the liquid phase 21b according to a distribution coefficient of the above-described product between the liquid phase 21a and the liquid phase 21b. A value of the distribution coefficient is determined by, for example, the kind of the solvent contained in the liquid phase 21a and the liquid phase 21b and the kind of the product in the solvent.

When the organic solvent of the liquid phase 21b is, for example, xylene and the product produced by the reduction reaction is, for example, ethanol, ethanol has a high hydrophilic property and an affinity between ethanol and xylene is high, so that ethanol dissolves in xylene at an arbitrary rate. At this time, a ratio of an ethanol concentration in the liquid phase 21b to an ethanol concentration in the liquid phase 21a is an almost fixed value regardless of an amount of ethanol. The above-described concentration ratio is referred to as the distribution coefficient.

When the product is ethanol, using a mixed solvent of m-xylene, hexanol, or the like makes it possible to easily extract the product from the liquid phase 21a by distillation, membrane separation, or the like. Thus, selecting a solvent capable of realizing easy extraction according to the product intended to extract makes it possible to easily move the product from the liquid phase 21a to the liquid phase 21b. Accordingly, it is possible to increase a concentration of the product contained in the liquid phase 21b. For example, a reduction product concentration of the liquid phase 21b per unit volume can be made higher than a reduction product concentration of the liquid phase 21a per the unit volume. Accordingly, it is possible to increase production efficiency of the reduction product. Further, it is possible to reduce energy necessary for separating the product by the distillation, the membrane separation, or the like compared with a case where there is not the liquid phase 21b. Note that even when the product produced by the reduction reaction has the hydrophilic property and the product concentration in the liquid phase 21b is low, it is possible to reduce the energy necessary for separating the product containing a low-concentration product by the distillation, the membrane separation, or the like based on differences in boiling point, molecular size, and the like.

Figure 2:
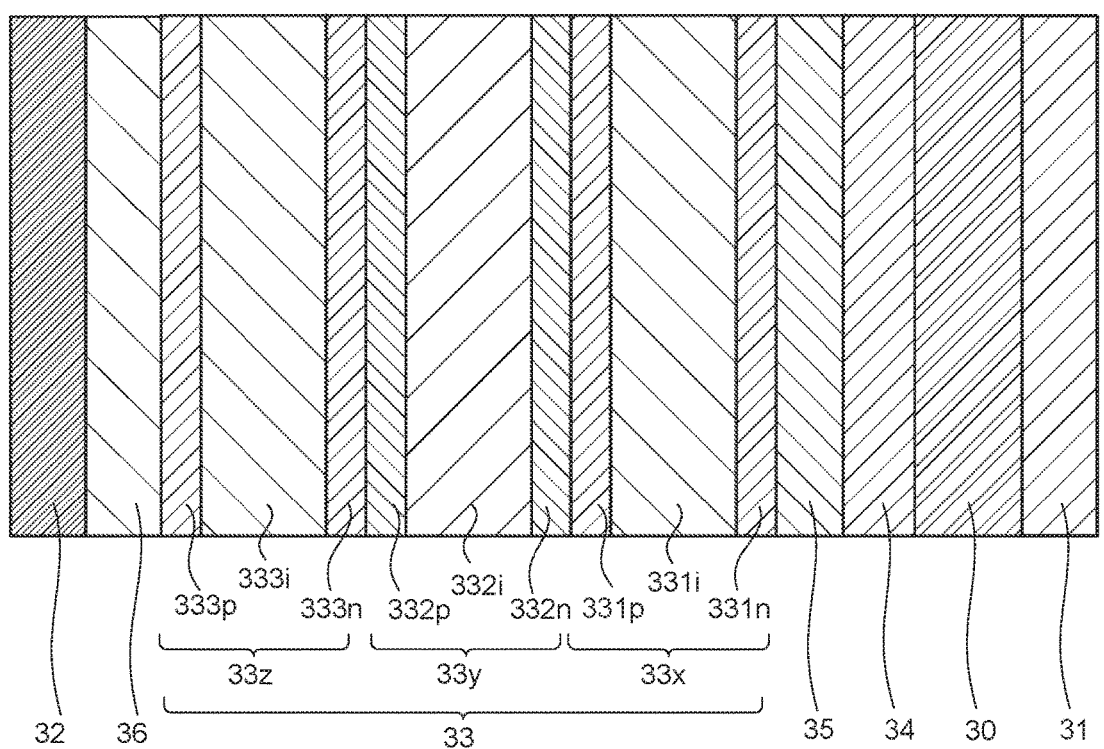
FIG. 2 is a schematic view illustrating a structure example of a photoelectric conversion cell.
Figure 3:
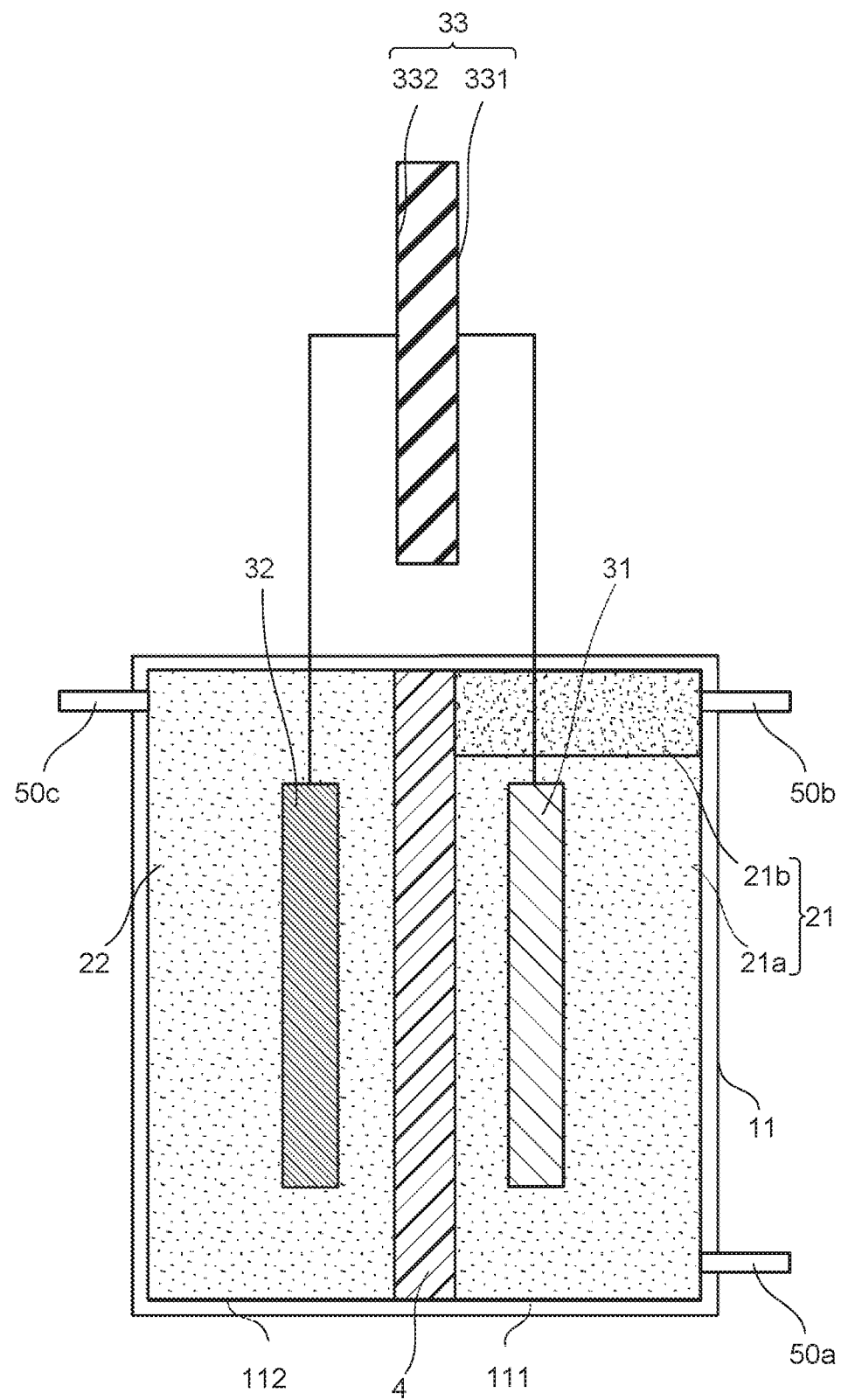
FIG. 3 is a schematic view illustrating another structure example of the electrochemical reaction device.

FIG. 2 is a schematic cross-sectional view illustrating a structural example of the photoelectric conversion cell. The photoelectric conversion cell illustrated in FIG. 2 includes a conductive substrate 30, the reduction electrode 31, the oxidation electrode 32, the photoelectric conversion body 33, a light reflector 34, a metal oxide body 35, and a metal oxide body 36.

The conductive substrate 30 is provided to be in contact with the reduction electrode 31. Note that the conductive substrate 30 may be regarded as a part of the reduction electrode. Examples of the conductive substrate 30 include a substrate containing at least one or a plural of Cu, Al, Ti, Ni, Fe, and Ag. For example, a stainless substrate containing stainless steel such as SUS may be used. Without limiting to the above, the conductive substrate 30 may be formed using a conductive resin. Further, the conductive substrate 30 may be formed using a semiconductor substrate of Si, Ge, or the like. Furthermore, a resin film or the like may be used as the conductive substrate 30. For example, a membrane applicable to the ion exchange membrane 4 may be used as the conductive substrate 30.

The conductive substrate 30 has a function as a supporter. The conductive substrate 30 may be provided to separate the storage part 111 and the storage part 112. Providing the conductive substrate 30 makes it possible to improve mechanical strength of the photoelectric conversion cell. Further, the conductive substrate 30 may be regarded as a part of the reduction electrode 31. Furthermore, the conductive substrate 30 need not necessarily be provided.

The reduction electrode 31 preferably contains the reduction catalyst. The reduction electrode 31 may contain both a conductive material and the reduction catalyst. Examples of the reduction catalyst include a material which reduces activation energy for reducing the hydrogen ions and carbon dioxide. In other words, Examples of the reduction catalyst include a material which lowers overvoltage when hydrogen and a carbon compound are produced by the reduction reaction of the hydrogen ions and carbon dioxide. For example, a metal material or a carbon material can be used. Examples of the metal material, in the case of hydrogen, there can be used a metal such as platinum or nickel, or an alloy containing the metal. In the reduction reaction of carbon dioxide, there can be used a metal such as gold, aluminum, copper, silver, platinum, palladium, or nickel, or an alloy containing the metal. Examples of the carbon material include graphene, carbon nanotube (CNT), fullerene, ketjen black, or the like. Note that without limiting to them, there may be used, for example, a metal complex such as a Ru complex or a Re complex and an organic molecule having an imidazole skeleton and a pyridine skeleton as the reduction catalyst. Further, a plurality of materials may be mixed.

The oxidation electrode 32 preferably contains the oxidation catalyst. The oxidation electrode 32 may contain both a conductive material and the oxidation catalyst. Examples of the oxidation catalyst include a material which reduces activation energy for oxidizing water. In other words, Examples of the oxidation catalyst include a material which lowers an overvoltage when oxygen and the hydrogen ions are produced by the oxidation reaction of water. Examples of the material include iridium, iron, platinum, cobalt, manganese, or the like. Further, as the oxidation catalyst, a binary metal oxide, a ternary metal oxide, a quaternary metal oxide, or the like can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), or the like. Examples of the ternary metal oxide include Ni—Co—O, La—Co—O, Ni—La—O, Sr—Fe—O, and so on. Examples of the quaternary metal oxide include Pb—Ru—Ir—O, La—Sr—Co—O, and so on. Note that without limiting to them, the metal complex such as the Ru complex or the Fe complex can be used as the oxidation catalyst. Further, a plurality of materials may be mixed.

At least one of the reduction electrode 31 or the oxidation electrode 32 may have a porous structure. Examples of a material applicable to the electrode having the porous structure include a carbon black such as ketjen black or VULCAN XC-72, activated carbon, metal fine powder, and so on in addition to the above-described materials. Having the porous structure makes it possible to increase an area of an active surface which contributes to the oxidation-reduction reaction, thereby allowing an increase in conversion efficiency.

The porous structure preferably has a pore distribution with 5 nm or more to 100 nm or less. Having the above-described pore distribution allows an increase in catalytic activity. Furthermore, the porous structure preferably has a plurality of pore distribution peaks. This enables all of an increase in a surface area, improvement in diffusibility of ions and a reaction substance, and high conductivity at the same time. For example, the reduction electrode 31 may be formed by stacking reduction catalyst layers containing 100 nm or less fine particles (fine particle-shaped reduction catalyst) of metal or an alloy applicable to the above-described reduction catalyst on a conductive layer made of the above-described material having the pore distribution with 5 µm or more to 10 µm or less. At this time, the fine particle may also have the porous structure, but it need not necessarily have the porous structure from the viewpoints of the conductivity and the relationship between a reaction site and substance diffusion. Further, the above-described fine particles may be supported by other material.

The reduction electrode 31 may have a stacked structure of a porous conductive layer and a porous catalyst layer containing the reduction catalyst. For example, a mixture of conductive particles of Nafion, ketjen black, and the like can be used as the porous conductive layer, and a gold catalyst can be used as the porous catalyst layer. Further, forming a concavity and convexity of 5 μm or less on the surface of the porous catalyst layer makes it possible to increase the reaction efficiency. Furthermore, the surface of the porous catalyst layer is oxidized by adding high frequency, and thereafter an electrochemical reduction allows forming of the reduction electrode 31 having a nanoparticle structure. Besides gold, a metal such as copper, palladium, silver, zinc, tin, bismuth, or lead is preferable. Further, the porous conductive layer may have the stacked structure in which each layer has a different pore size further. For example, a reaction difference due to a difference in a reaction product concentration near the electrode, a difference in a pH value, or the like is regulated by the pore size, and it becomes possible to improve efficiency owing to the stacked structure in which each layer has the different pore size.

When an electrode reaction at low current densities is performed using relatively low irradiation energy of light, there is a wide choice of catalyst materials. Accordingly, for example, it is easy to perform a reaction using a ubiquitous metal or the like, and it is also relatively easy to obtain selectivity of the reaction. On the other hand, when the photoelectric conversion body 33 is not provided in the electrolytic solution tank 11 but the photoelectric conversion body 33 is electrically connected to at least one of the reduction electrode 31 or the oxidation electrode 32 by wiring or the like, an electrode area becomes small generally due to a reason for miniaturizing the electrolytic solution tank or the like and the reaction is sometimes performed at high current densities. In this case, a precious metal is preferably used as the catalyst.

The photoelectric conversion body 33 includes a stacked structure having a photoelectric conversion layer 33$x$, a photoelectric conversion layer 33$y$, and a photoelectric conversion layer 33$z$. The number of stacks of the photoelectric conversion bodies is not limited to the number of stacks in FIG. 2.

The photoelectric conversion layer 33$x$ has, for example, an n-type semiconductor layer 331$n$ containing n-type amorphous silicon, an i-type semiconductor layer 331$i$ containing intrinsic amorphous silicon germanium, and a p-type semiconductor layer 331$p$ containing p-type microcrystalline silicon. The i-type semiconductor layer 331$i$ is a layer which absorbs light in a short wavelength region including, for example, 400 nm. Accordingly, in the photoelectric conversion layer 33$x$, charge separation is caused by energy of the light in the short wavelength region.

The photoelectric conversion layer 33$y$ has, for example, an n-type semiconductor layer 332$n$ containing n-type amorphous silicon, an i-type semiconductor layer 332$i$ containing intrinsic amorphous silicon germanium, and a p-type semiconductor layer 332$p$ containing p-type microcrystalline silicon. The i-type semiconductor layer 332$i$ is a layer which absorbs light in an intermediate wavelength region including, for example, 600 nm. Accordingly, in the photoelectric conversion layer 33$y$, charge separation is caused by energy of the light in the intermediate wavelength region.

The photoelectric conversion layer 33$z$ has, for example, an n-type semiconductor layer 333$n$ containing n-type amorphous silicon, an i-type semiconductor layer 333$i$ containing intrinsic amorphous silicon, and a p-type semiconductor layer 333$p$ containing p-type microcrystalline silicon. The i-type semiconductor layer 333$i$ is a layer which absorbs light in a long wavelength region including, for example, 700 nm. Accordingly, in the photoelectric conversion layer 33$z$, charge separation is caused by energy of the light in the long wavelength region.

The p-type semiconductor layer or the n-type semiconductor layer can be formed by, for example, adding an element which becomes a donor or an acceptor to a semiconductor material. Note that in the photoelectric conversion layer, a semiconductor layer containing silicon, germanium or the like is used as the semiconductor layer, but without limiting to the above, for example, a compound semiconductor layer or the like can be used. Examples of the compound semiconductor layer include a semiconductor layer containing, for example, GaAs, GaInP, AlGaInP, CdTe, CuInGaSe, or the like. Further, a layer containing material such as $TiO_2$ and $WO_3$ may be used as long as it is capable of photoelectric conversion. Furthermore, each semiconductor layer may be monocrystalline, polycrystalline, or amorphous. Further, the photoelectric conversion layer may be provided with a zinc oxide layer.

The light reflector 34 is provided between the conductive substrate 30 and the photoelectric conversion body 33. Examples of the light reflector 34 include a distributed Bragg reflector composed of a stack of metal layers or semiconductor layers. Providing the light reflector 34 makes it possible to reflect light which has not been absorbed by the photoelectric conversion body 33 and to make the light incident on any of the photoelectric conversion layer 33$x$ to the photoelectric conversion layer 33$z$, and thereby it is possible to increase the conversion efficiency from light to a chemical substance. Examples of the light reflector 34 include a layer of a metal such as Ag, Au, Al, or Cu, an alloy containing at least one of these metals, or the like.

The metal oxide body 35 is provided between the light reflector 34 and the photoelectric conversion body 33. The metal oxide body 35 has a function of, for example, adjusting an optical distance and enhancing light reflectivity. As the metal oxide body 35, it is preferable to use a material capable of coming into ohmic contact with the n-type semiconductor layer 331$n$. Examples of the metal oxide body 35 a layer of a light transmissive metal oxide such as indium tin oxide (ITO), zinc oxide (ZnO), fluorine-doped tin oxide (FTO), aluminum-doped zinc oxide (AZO), and antimony-doped tin oxide (ATO).

The metal oxide body 36 is provided between the oxidation electrode 32 and the photoelectric conversion body 33. The metal oxide body 36 may be provided on the surface of the photoelectric conversion body 33. The metal oxide body 36 has a function as a protective layer which suppresses breakage of the photoelectric conversion cell due to the oxidation reaction. Providing the metal oxide body 36 makes it possible to suppress corrosion of the photoelectric conversion body 33 and to make a lifetime of the photoelectric conversion cell long. Note that the metal oxide body 36 need not necessarily be provided.

Examples of the metal oxide body 36 include a dielectric thin film such as $TiO_2$, $ZrO_2$, $Al_2O_3$, $SiO_2$, or $HfO_2$. A thickness of the metal oxide body 36 is preferably 10 nm or less, more preferably 5 nm or less. It is intended for obtaining conductivity owing to tunnel effect. Examples of the metal oxide body 36 include a layer of a metal oxide having a light transmitting property such as indium tin oxide (ITO), zinc oxide (ZnO), fluorine-doped tin oxide (FTO), aluminum-doped zinc oxide (AZO), or antimony-doped tin oxide (ATO).

The metal oxide body 36 may have, for example, a structure in which metal and a transparent conductive oxide are stacked, a structure in which the metal and another conductive material are compounded, or a structure in which the transparent conductive oxide and the other conductive material are compounded. Having the above-described structures allows reduction in the number of parts, light weight, easy manufacture, and a low cost in addition. The metal oxide body 36 may have functions as a protective layer, a conductive layer, and a catalyst layer.

In the photoelectric conversion cell illustrated in FIG. 2, a surface of the n-type semiconductor layer 331$n$ opposite to a contact surface with the i-type semiconductor layer 331$i$ becomes a first face of the photoelectric conversion body 33, and a surface of the p-type semiconductor layer 333$p$ opposite to a contact surface with the i-type semiconductor layer 333$i$ becomes a second face. The photoelectric conversion cell illustrated in FIG. 2 can absorb the light of the wavelength in a wide region of the sunlight and more efficiently utilize the energy of the sunlight by stacking the photoelectric conversion layer 33$x$ to the photoelectric conversion layer 33$z$. At this time, because the respective photoelectric conversion layers are serially connected, it is possible to obtain high voltage.

In FIG. 2, since the electrodes are stacked on the photoelectric conversion body 33, it is possible to utilize the charge-separated electrons and holes as they are for the oxidation-reduction reaction. Further, there is no need to electrically connect the photoelectric conversion body 33 and the electrodes by wiring or the like. Consequently, it is possible to perform the oxidation-reduction reaction with high efficiency.

A plurality of photoelectric conversion bodies may be electrically connected in a parallel connection. A two-junction type and a single-layer type photoelectric conversion bodies may be used. A stack of two layers or four layers or more of the photoelectric conversion bodies may be held. A single-layer photoelectric conversion body may be used instead of the stack of the plurality of photoelectric conversion bodies.

The electrochemical reaction device of this embodiment is a system simplified by integrating the reduction electrode, the oxidation electrode, and the photoelectric conversion body and reducing the number of parts. Accordingly, for example, at least one of manufacture, installation, and maintenance becomes easy. Furthermore, since the wiring or the like which connects the photoelectric conversion body to the reduction electrode and the oxidation electrode becomes unnecessary, it is possible to increase a light transmittance and make a light receiving area large.

The photoelectric conversion body 33 sometimes corrodes due to contact with the electrolytic solution, whose deterioration is caused by dissolution of a corrosion product in the electrolytic solution. In order to prevent the corrosion, providing a protective layer is cited. However, a protective layer component sometimes dissolves in the electrolytic solution. Accordingly, the deterioration of the electrolytic solution is suppressed by providing a filter such as a metal ion filter in the flow paths and the electrolytic solution tank.

The structural example of the electrochemical reaction device is not limited to that in FIG. 1. FIG. 3 to FIG. 6 are schematic views illustrating other examples of the electrochemical reaction device. In the electrochemical reaction device illustrated in FIG. 3, the photoelectric conversion body 33 is provided in the outside of the electrolytic solution tank 11. The face 331 and the reduction electrode 31, and the face 332 and the oxidation electrode 32 are connected by, for example, conductive members such as the wiring. When the photoelectric conversion body is connected to the reduction electrode or the oxidation electrode by the wiring or the like, constituents are separated for each function, which is thereby advantageous in a system.

Figure 4:
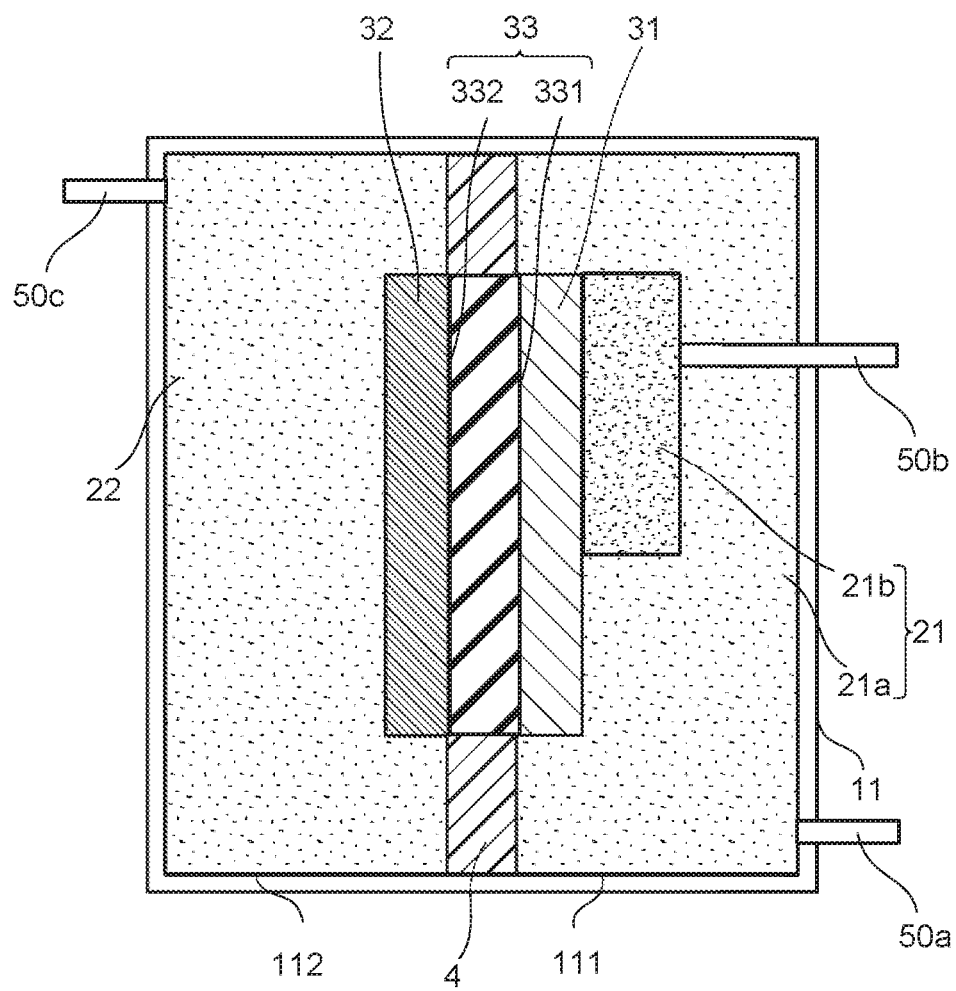
FIG. 4 is a schematic view illustrating another structure example of the electrochemical reaction device.

In the electrochemical reaction device illustrated in FIG. 4, the liquid phase 21$b$ is in contact with the reduction electrode 31. In this case, it is possible to move the product produced by the reduction reaction in the liquid phase 21$b$ to the liquid phase 21$a$ according to the distribution coefficient of the product between the liquid phase 21$a$ and the liquid phase 21$b$. Accordingly, the production efficiency of the reduction product improves. Further, both the liquid phase 21$a$ and the liquid phase 21$b$ may be in contact with the reduction electrode 31.

The product to be extracted from the liquid phase 21$b$ by the distillation, the membrane separation, or the like is preferably selected in consideration of, for example, the boiling points of the components of the liquid phase 21$a$ and the liquid phase 21$b$, the affinity between the product and the liquid phase 21$a$, or the like. For example, a case of distilling ethanol from each of water and xylene is considered. The boiling point of water is 100° C. at one atmosphere of pressure, the boiling point of xylene is 144° C. at one atmosphere of pressure, and the boiling point of ethanol is 78° C. at one atmosphere of pressure. It is found that ethanol is extracted from xylene more easily than from water in terms of a difference in the above-described boiling points and a difference in ease of azeotrope. Note that without limiting to the above, the product produced in xylene by the reduction reaction may be moved into water and extracted by the distillation.

Even if the product is extracted from a solvent having a lower concentration by the distillation in a relation to the above-described distribution coefficient, these relations to the overall energy, cost, and system are arbitrary. Accordingly, from the liquid phase in which a concentration of the product intended to extract is low of the liquid phase 21$a$ and the liquid phase 21$b$, the product may be extracted by the distillation or the like. Further, similarly in the membrane separation, a solvent having a higher separation can be selected depending on differences in a size, shape, and hydrophobic property of a molecule.

The liquid phase 21$a$ may contain salt. Examples of salt include a first salt having at least one element of sodium, potassium, magnesium, calcium, iron, nickel, and cobalt, a second salt having at least one element of fluorine, chlorine, bromine, and iodine, and the like. Furthermore, Examples of the first salt include sodium chloride, magnesium hydroxide, potassium sulfate, calcium carbonate, cobalt hydroxide, or the like. Further, Examples of the second salt include sodium chloride, magnesium chloride, iron chloride, cobalt chloride, cobalt iodide, or the like. Mixing salt in the liquid phase 21$a$ makes it possible to change the distribution coefficient of the reduction product between the liquid phase 21$a$ and the liquid phase 21$b$. An organic compound or the like has a property of not dissolving or not easily dissolving in a solution of high-concentration salt. For example, when salt is added to an aqueous solution, water molecules can be fixed as hydrated water due to its strong hydration force. Accordingly, it is possible to easily move the product intended to recover and produced by the reduction reaction to the liquid phase 21$b$. Because the same effect is given also on a low-molecular organic substance, containing salt in, for example, methanol, ethanol, butanol, ethylene glycol, and the like makes it possible to easily move the product to the liquid phase 21$b$.

Providing a temperature regulating device which regulates temperatures of the electrolytic solution 21 and the electrolytic solution 22, for example, in the electrolytic solution tank 11 makes it possible to decrease a temperature difference between the electrolytic solution 21 and the electrolytic solution 22 and increase separation efficiency of the product. Further, a temperature rise of the electrochemical reaction device can be suppressed. Furthermore, selectivity of the catalyst can be changed.

When specific gravity of the liquid phase 21b is higher than specific gravity of the liquid phase 21a, the liquid phase 21b can pass the liquid phase 21a from over the liquid phase 21a in a gravity direction to be sent in, thereby improving accessibility to the liquid phase 21a and it is possible to efficiently move the reduction product dissolved in the liquid phase 21a to the liquid phase 21b. The liquid phase 21b containing the above-described product is taken out and at least a part of the product is separated or reacted, and thereafter the reaction efficiency can be improved by circulating the liquid phase 21b to an upper portion of the liquid phase 21a in the gravity direction again.

At least a part of the electrolytic solution 21 containing at least one of the liquid phase 21a and the liquid phase 21b containing the product may be supplied via the flow path to another electrolytic solution tank 11. This makes it possible to continuously react a reaction product. Accordingly, a solvent suitable for a reaction in the next-stage electrolytic solution tank 11 can be used for the liquid phase 21b or the liquid phase 21a in the next-stage electrolytic solution 21, and it is not necessary to perform solvent replacement. Further, because it is possible to select a solvent suitable for separation and purification of the reaction product in the next-stage electrolytic solution tank 11, the reaction efficiency can be increased.

Because the distribution coefficient is changed by the product produced by the reduction reaction in the next-stage electrolytic solution tank 11, the product can be condensed by the continuous reaction. Consequently, the production efficiency of the reduction product can be further increased. In addition, because a concentration of the reduction product produced first is decreased by the reaction, the distillation, the membrane separation, or the like at the next stage, the product moves according to the distribution coefficient.

When the product produced in the liquid phase 21a moves to the liquid phase 21b and a product concentration in the liquid phase 21b is decreased by the reaction and the distillation at the next stage, the product contained in the liquid phase 21a moves to the liquid phase 21b according to chemical equilibrium. Consequently, it is possible not only to be efficient owing to the continuous reaction but also to increase the reaction efficiency without undergoing a decrease in efficiency due to reaction diffusion of the product and restriction of solubility in the liquid phase 21a. Relations of positions and the reaction among the reduction electrode 31, the liquid phase 21a, and the liquid phase 21b at this time are arbitrary, and the same effect can be obtained by selecting a combination suitable for any combination.

When an impurity is generated by the oxidation-reduction reaction to prevent the oxidation-reduction reaction or the production efficiency of the product is decreased by a lifetime of a photo-electrochemical reaction device, corrosion of the electrolytic solution tank 11, or the like, one of the liquid phase 21a and the liquid phase 21b may catch the impurity and the other may perform the reduction reaction, for example. This makes it possible to improve continuity of the reduction reaction. This relation between the liquid phases is arbitrary, and the same effect can be obtained by selecting a combination suitable for any combination.

When plural kinds of reduction products are held, it is possible to recover one kind of the plural kinds of reduction products from the liquid phase 21a and recover another kind of them from the liquid phase 21b. This makes it possible to efficiently recover each of the products. Further, one product may be recovered from the liquid phase 21a and another product having a slow reaction rate may be recovered from the liquid phase 21b by utilizing a difference in a reaction rate. Furthermore, when excess power, nighttime power, and natural energy are used, the product can be recovered according to sunshine, wind condition, or the like.

When the liquid phase 21a and the liquid phase 21b are in contact with the reduction electrode 31, a rate of the product can be changed by changing a contact area. The contact area can be regulated by, for example, changing supplied volume (solution volume) of the liquid phase 21a and the liquid phase 21b. This makes it possible to perform the reaction more efficiently according to electric power, natural environment, and a demand for the product. Consequently, for example, it is possible to perform the reaction according to situations of low-cost operation, highly efficient operation, and the like.

Figure 5:
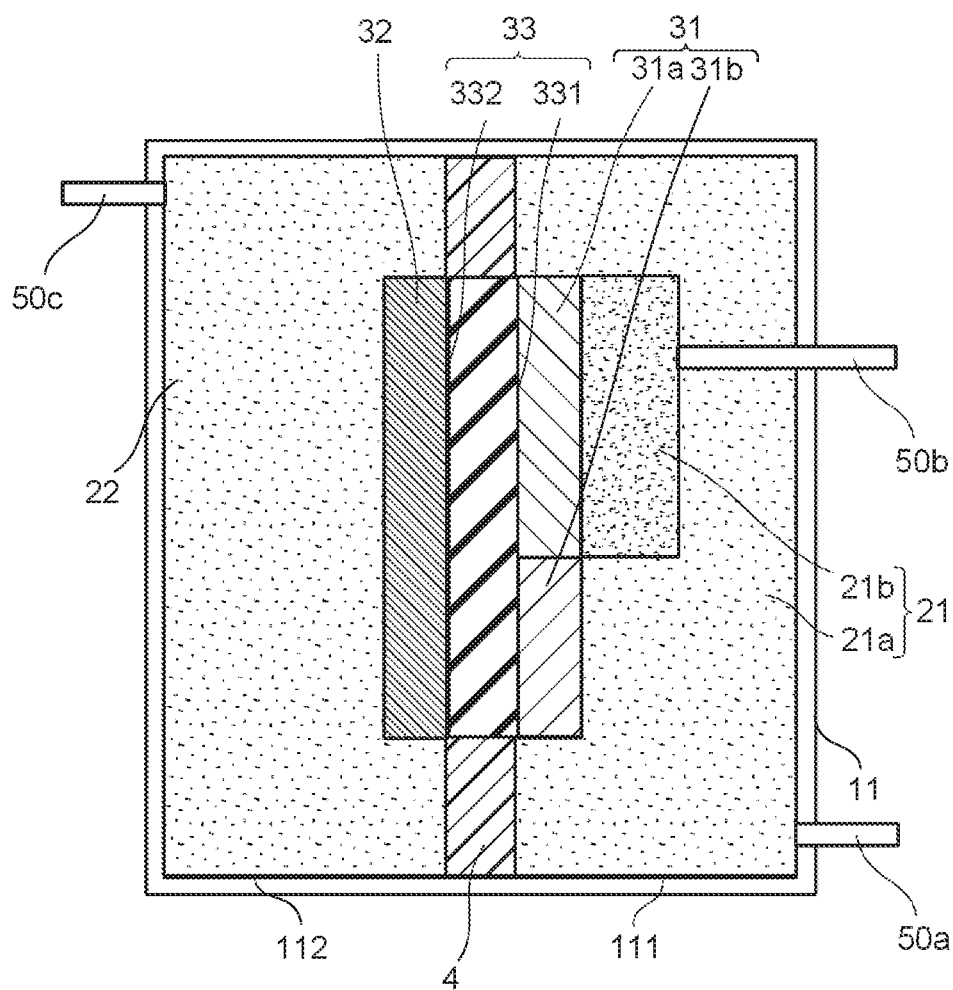
FIG. 5 is a schematic view illustrating another structure example of the electrochemical reaction device.

The electrochemical reaction device illustrated in FIG. 5 has a region 31a where the reduction electrode 31 contains a first reduction catalyst and is in contact with the liquid phase 21b and a region 31b where the reduction electrode 31 contains a second reduction catalyst different from the first reduction catalyst and is in contact with the liquid phase 21a. As the first reduction catalyst and the second reduction catalyst, applicable materials as the reduction catalysts can be appropriately used. This allows the suitable reduction reaction for each of the liquid phases to progress.

In a case of the above-described structure, the oxidation-reduction reaction can be continuously performed. For example, it is possible to move the product produced in the liquid phase 21a by the reduction reaction to the liquid phase 21b, perform the reduction reaction of the above-described product in the liquid phase 21b, and produce another compound continuously. The relations of the positions and the reaction among the reduction electrode 31, the liquid phase 21a, and the liquid phase 21b at this time are arbitrary, and the same effect can be obtained by selecting a combination suitable for any combination.

Figure 6:
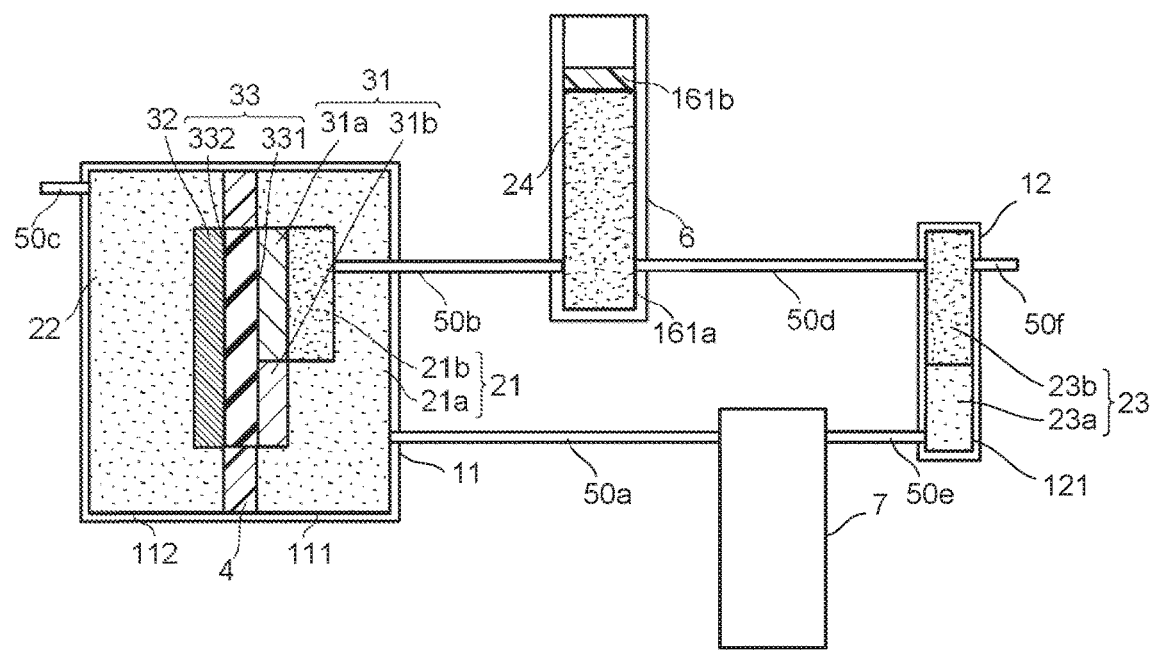
FIG. 6 is a schematic view illustrating another structure example of the electrochemical reaction device.

The electrochemical reaction device illustrated in FIG. 6 includes components illustrated in FIG. 1, a electrolytic solution tank 12, a separation tank 6 separating a part of the product in the liquid phase 21b, a recovery device 7 recovering at least part of the substance to be reduced. The flow path 50a illustrated in FIG. 6 connects the liquid phase 21a and the recovery device 7. The flow path 50b illustrated in FIG. 6 connects the liquid phase 21b and the separation tank 6. The electrochemical reaction device illustrated in FIG. 6 further includes a flow path 50d connecting the separation tank 6 and the liquid phase 21a, a flow path 50e connecting the electrolytic solution tank 12 and the recovery device 7, and a flow path 50f for releasing the product to an outside of the electrolytic solution tank 12. The explanation of FIG. 1 can be properly used for components similar to that in the electrochemical reaction device shown in FIG. 1. The separation tank 6 and the recovery device 7 need not necessarily be provided.

The electrolytic solution tank 12 has a storage part 121 storing a electrolytic solution 23. Incidentally, since explanation of the electrolytic solution tank 12 can be properly used for explanation of the electrolytic solution tank 11. The electrolytic solution tank 12 has a liquid phase 23a and a liquid phase 23b in contact with the liquid phase 23a. Examples of the liquid phase 23a include water. The liquid phase 23a is connected to the recovery device 7 via the flow path 50e. Examples of the liquid phase 23a include the material applicable to the liquid phase 21a. The liquid phase 23b is connected to the separation tank 6 via the flow path 50d. Examples of the liquid phase 23b include an organic solvent. Examples of the organic solvent include the organic solvent applicable to the liquid phase 21b. At least one liquid phase of the liquid phase 23a or the liquid phase 24a contains the substance to be reduced. The electrolytic solution tank 12 may perform distillation, membrane separation, or the like. The electrolytic solution tank 12 may have a product recovery flow path.

The separation tank 6 separates at least part of the product in a electrolytic solution applied from the electrolytic solution tank 11. Examples of a separating method at the separation tank 6 include distillation, membrane separation, or the like. FIG. 6 shows that an example of separation of the product by the membrane separation.

The separation tank 6 illustrated in FIG. 6 has a storage part 161a storing a electrolytic solution 24 and a gas-liquid separation membrane 161b provided to separate the storage part 161a into a plurality of regions. The electrolytic solution 24 is at least part of the liquid phase 21b applied via the flow path 50b. The gas-liquid separation membrane 161b include, for example, a hollow fiber membrane and so on. The hollow fiber membrane includes, for example, a silicone resin or a fluorine-based resin (perfluoro alkoxy alkane (PFA), perfluoro ethylenepropene copolymer (FEP), polytetrafluoroethylene (PTFE), ethylene tetrafluoroethylene copolymer (ETFE), polyvinylidene fluoride (PVDF), polychlorotrifluoroethylene (PCTFE), ethylene-chlorotrifluoroethylene copolymer (ECTFE)) or the like.

In the separation tank 6 illustrated in FIG. 6, reduction of the pressure on the outside of the gas-liquid separation membrane 161b (the opposite side to the contact surface with the electrolytic solution 24) and passage of the electrolytic solution 24 containing a gaseous product through the gas-liquid separation membrane 161b makes it possible to efficiently separate the gaseous product.

In the recovery device 7, the exhausted carbon dioxide absorbs into an amine solution or zeolite. Re-emission of the absorbed carbon dioxide by heat or the like can increase the concentration and purity of the substance to be reduced. Thus obtained the substance to be reduced is, for example, buried in the earth or used for extraction of a natural gas or a shale gas, whereby an increase in concentration of the substance to be reduced in the air can be suppressed. At least part of the liquid phase 23a is applied to the recovery device 7 via the flow path 50e, and a electrolytic solution which has high concentration of the substance to be reduced and is produced by the recovery device 7 is reapplied to the a storage part 111. This increases a oxidation-reduction efficiency of the electrochemical reaction device. The use of the recovery device 7 as described above can reduce the exhaust amount of the substance to be reduced such as carbon dioxide, improve the whole system efficiency through use of oxygen, and realize a system capable of obtaining valuable resources. The system using carbon dioxide as the substance to be reduced is also referred to as a carbon capture storage (CCS).

Next, an operation example of the electrochemical reaction device illustrated in FIG. 6 will be described. The electrochemical reaction device illustrated in FIG. 6 producats the product by the oxidation-reduction reaction as in the electrochemical reaction device illustrated in FIG. 1. At this time, the liquid phase 21b contains the product.

In the electrochemical reaction device illustrated in FIG. 6, a temperature difference is made between the liquid phase 21a and the liquid phase 23b. For example, the temperature of the liquid phase 21a is lowered than the temperature of the liquid phase 23b. The temperature of the liquid phase 21a is preferably 80° C. or less. The temperature of the liquid phase 21a is preferably 0 to 40° C. The temperature of the liquid phase 23b is preferably 100° C. or less. The temperature of the liquid phase 23b is preferably 50 to 80° C. This increases stability of the product and the electrolytic solution component, and increases energy efficiency.

The electrochemical reaction device may include a heater for heating the electrolytic solution 23 and a cooler for cooling the liquid phase 21a or a electrolytic solution applied to the recovery device 7 to make a temperature different between the liquid phase 21a and the liquid phase 23b. Each of the cooler and the heater is controlled by a controller such as the temperature regulator.

When at least one liquid phase of the liquid phase 21a and the liquid phase 21b include the ionic liquid containing the substance to be reduced, it moves to the liquid phase 21a. In other words, the ionic liquid moves to the liquid phase 21a containing the organic solvent by the increase of a temperature of the electrolytic solution. At least part of the liquid phase 21a moves to the separation tank 6 via the flow path 50b. The separation tank 6 separates at least part of the product from the electrolytic solution.

A separated electrolytic solution at the separation tank 6 moves to the separation tank 12. When the electrolytic solution 23 contains the ionic liquid containing the substance to be reduced and the product and the liquid phase 23b has a temperature higher than a temperature of the liquid phase 21a, the ionic liquid moves to the liquid phase 23b. This enables the effective recovery of a organic product such as methanol and ethylene glycol from a liquid phase containing the ionic liquid.

Separation with a temperature difference of several tens of ° C. lowers recovery energy of the product. Therefore, a cost is reduced.

The organic solvent has a boiling point of about 60 to 150° C. normally. In constant, the ionic liquid has a boiling point of about 300° C. Therefore, when methanol as the product is separated by distillation, azeotrope between the ionic liquid and methanol does not occur easily. This makes it possible to recover only methanol by one time distillation.

In a case of membrane separation, the use of a ionic liquid having a molecule which has a large size enables a easy separation of the product. The product may be recovered after changing a ion balance of a electrolytic solution to change the ionic liquid from liquid to solid by mixing a salt applicable to the liquid phase 21a and a mixture of a separated product and the ionic liquid.

When the liquid phase 23b has a temperature higher than a temperature of the liquid phase 21a, the substance to be reduced in the liquid 23b is effectively released via the flow path 50f. At this time, the substance to be reduced may be released by membrane separation.

The ionic liquid decreases a overvoltage by reduction reaction. The oxidation-reduction reaction progresses continuously by recovery or removal of impurity in a liquid phase containing water. Even if not the ionic liquid, the distribution coefficient changes. Therefore, a concentrated product enables the increase of separation-recovery efficiency of the product. Even if not the ionic liquid, a material to decrease a reduction potential of carbon dioxide is preferable. The material has high ionic conductivity and carbon dioxide absorbability.

The substance to be reduced is absorbed by a electrolytic solution having a lower temperature and released from a electrolytic solution having a higher temperature by organic material having a high absorptivity and containing the ionic liquid, the amine, or the like. At least part of the substance to be reduced can be effectively reduced to make a energetic material. Therefore, the efficiency of the entire system improves.

At least part of the liquid 23a is applied to the recovery device 7 via the flow path 50e. When a electrolytic solution applied to the recovery device 7 is cooled, at least part of the substance to be reduced is not easily to be dissolved. The recovery device 7 recovers a undissolved substance to be reduced. An electrolytic solution after the recovery is applied the liquid phase 21a via the flow path 50a. The electrolytic solution may be circulated between the electrolytic solution tank 11 and the electrolytic solution tank 12 using a pump.

The temperature of the liquid phase 21a may be higher than the temperature of the liquid phase 23a. This increases the catalytic activity of the reduction catalyst to increase the efficiency reduction reaction in the ionic liquid. An electrolytic solution after the reaction may be cooled in the electrolytic solution tank 12 to move the ionic liquid to the liquid phase containing water and separate the product.

Examples

Example 1

An electrochemical reaction device including a structure was fabricated. The structure has a three-junction type photoelectric conversion body having a thickness of 500 nm, a ZnO layer having a thickness of 300 nm and provided on a first face of the three-junction type photoelectric conversion body, a Ag layer having a thickness of 200 nm and provided on the ZnO layer, a SUS substrate having a thickness of 1.5 mm and provided on the Ag layer, and an ITO layer having a thickness of 100 nm and provided on a second face of the three junction type photoelectric conversion body. Note that each layer on the SUS substrate has a textured structure of submicron order in order to obtain a light confinement effect.

The three junction type photoelectric conversion body has a first photoelectric conversion layer which absorbs light in a short wavelength region, a second photoelectric conversion layer which absorbs light in an intermediate wavelength region, and a third photoelectric conversion layer which absorbs light in a long wavelength region. The first photoelectric conversion layer has a p-type microcrystalline silicon layer, an i-type amorphous silicon layer, and an n-type amorphous silicon layer. The second photoelectric conversion layer has a p-type microcrystalline silicon layer, an i-type amorphous silicon germanium layer, and an n-type amorphous silicon layer. The third photoelectric conversion layer has a p-type microcrystalline silicon germanium layer, an i-type amorphous silicon layer, and an n-type amorphous silicon layer.

Next, a Ni catalyst layer with a thickness of 5 nm was formed on the ITO layer as an oxidation catalyst by an atomic layer deposition method. Further, a conducting wire was connected to a rear surface of the SUS substrate. A composite substrate (4 cm square) having the SUS substrate having the thickness of 1.5 mm and connected via the conducting wire and a copper-supported carbon film with a supported amount of 0.5 mg/cm$^2$ on the SUS substrate was prepared. An ion exchange membrane (Nafion 117, 6 cm square) was provided between the composite substrate and the structure, and a potassium carbonate solution was supplied into a module. The composite substrate served as a reduction electrode, an oxidation catalyst side of the structure served as an oxidation electrode, and a silver-silver chloride electrode served as a reference electrode. Current was made flow under a condition of 0.5 mA/cm$^2$ using a galvanostat and carbon dioxide was reduced to produce methanol and ethanol. At this time, toluene of 2 ml and an aqueous potassium hydrogen carbonate solution of 10 ml were supplied as an electrolytic solution of a reduction side.

The above-described structure was irradiated with light using a solar simulator (AM 1.5, 1000 W/m$^2$) and gas to be generated from a reduction electrode side was collected to measure conversion efficiency of carbon dioxide. The gas was recovered in an upper portion of the reduction electrode and the gas to be generated was sampled to perform identified determination by gas chromatography.

Products were repeatedly extracted from toluene after a one-hour reaction time elapsed, and thereafter distillation of extracts was performed. An obtained amount of methanol was 0.03 mg, and an obtained amount of ethanol was 0.005 mg. This indicates that the product produced by a reduction reaction moves to a liquid phase containing an organic solvent.

Example 2

An organic compound of 1 ml expressed by a formula [PEG$_m$(mim)$_2$][NTf$_2$]$_2$(m=500) and water of 10 ml were applied to the electrochemical reaction device of Example 1 as an electrolytic solution of a reduction side. PEG is poly ethylene glycol. NTF is bis(trifluoromethanesulfonyl)imide. Mim is methylimidazolium. Methanol of 3 ml and ethyl acetate of 3 ml were added in the electrolytic solution of a reduction side as a simulated product. Change of the electrolytic solution when a temperature of the electrolytic solution raised from 20 to 50° C. was determined. In the electrolytic solution at 20° C., the a liquid phase containing the methanol and the ethyl acetate and a liquid phase containing the ionic liquid and the water separated. In the electrolytic solution at 50° C., the a liquid phase containing the water and a liquid phase containing the ionic liquid which has the methanol and the ethyl acetate separated.

Example 3

An organic compound of 1 ml and water of 10 ml were applied to the electrochemical reaction device of Example 1 as an electrolytic solution of a reduction side. The organic compound consists of a polyethylene glycol molecule, two methylimidazolium molecules bonded each other via the polyethylene glycol molecule, and a bis(trifluoromethanesulfonyl)imide bonded the methylimidazolium molecule. The polyethylene glycol molecule has 500 pieces of ethylene glycol molecules. Ethylene glycol of 3 ml and ethyl acetate of 3 ml were added in the electrolytic solution of a reduction side as a simulated product. Change of the electrolytic solution when a temperature of the electrolytic solution raised from 20 to 50° C. was determined. In the electrolytic solution at 20° C., the a liquid phase containing the ethylene glycol and the ethyl acetate and a liquid phase containing the ionic liquid and the water separated. In the electrolytic solution at 50° C., the a liquid phase containing the water and a liquid phase containing the ionic liquid which has the ethylene glycol and the ethyl acetate separated. A result of Example 2 and Example 3 shows that a change of the electrolytic solution temperature increases efficiency of phase separation.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of using an electrochemical reactor, comprising:
preparing an electrochemical reactor, the electrochemical reactor having
a tank including a first room and a second room,
a first electrode disposed in the first room and configured to reduce a first substance,
a second electrode disposed in the second room and configured to oxidize a second substance,
a first pipe connected to the first room, and
a second pipe connected to the first room and disposed above the first pipe;
supplying a first liquid into the first room and the first pipe and a second liquid into the first room and the second pipe to form a first electrolytic solution, and supplying a second electrolytic solution into the second room, the first liquid containing water and forming a first liquid phase in the first electrolytic solution, the second liquid containing an organic solvent and forming a second liquid phase in the first electrolytic solution, the second electrolytic solution containing the second substance, and at least one liquid selected from the group consisting of the first and second liquids further containing the first substance;
applying a voltage between the first and second electrodes to reduce the first substance and thus form a reduction product and to oxidize the second substance and thus form a oxidization product; and
recovering the reduction product with the second liquid through the second pipe, and recovering the oxidization product.

2. The method according to claim 1,
wherein the second substance includes water, and
wherein the first substance includes carbon dioxide.

3. The method according to claim 1,
wherein the organic solvent contains a hydrophobic organic compound.

4. The method according to claim 1,
wherein the first electrode has a first region and a second region,
the first region containing a first reduction catalyst and being disposed closer to a mouth of the second pipe than to a mouth of the first pipe, and
the second region containing a second reduction catalyst and being disposed closer to the mouth of the first pipe than to the mouth of the second pipe.

5. The method according to claim 1,
wherein the first liquid further contains a first salt or a second salt,
the first salt having at least one element selected from the group consisting of sodium, potassium, magnesium, calcium, iron, nickel, and cobalt, and
the second salt having at least one element selected from the group consisting of fluorine, chlorine, bromine, and iodine.

6. The method according to claim 1,
wherein the electrochemical reactor further comprises a photoelectric convertor having a first surface connected to the first electrode and a second surface connected to the second electrode.

7. The method according to claim 1,
wherein the electrochemical reactor further comprises an ion exchange membrane disposed between the first and second rooms.

8. The method according to claim 1,
wherein the organic solvent has an ionic liquid.

9. The method according to claim 1,
wherein a concentration of the reduction product in the second liquid phase per unit volume is higher than a concentration of the reduction product in the first liquid phase per the unit volume.

10. The method according to claim 1,
wherein the electrochemical reactor further comprises a second tank to store a third electrolytic solution having a third liquid phase and a fourth liquid phase, the third liquid phase containing the water, and the fourth liquid phase containing the organic solvent,
wherein the first pipe connects the first room and the second tank,
wherein the second pipe connects the first room and the second tank,
wherein each of the first and fourth liquid phases contains an ionic liquid,
wherein at least one liquid phase selected from the group consisting of the third and fourth liquid phases contains the first substance,
wherein a temperature of the first liquid phase is different from a temperature of the fourth liquid phase.

11. The method according to claim 1,
wherein the electrochemical reactor further comprises:
a second tank to store a third electrolytic solution having a third liquid phase and a fourth liquid phase, the third liquid phase containing the water, and the fourth liquid phase containing the organic solvent;
a third tank to separate a part of the reduction product in the second liquid phase;
a recovery device to recover at least part of the first substance in the third liquid phase;
a third pipe connecting the second tank and the recovery device;
a fourth pipe connecting the second tank and the third tank; and
a fifth pipe connecting the second tank and an outside of the second tank,
wherein the first pipe connects the first room and the recovery device,
wherein the second pipe connects the first room and the third tank,
wherein each of the first and fourth liquid phases contains an ionic liquid,
wherein at least one liquid phase selected from the group consisting of the third and fourth liquid phases contains the first substance,
wherein a temperature of the first liquid phase is different from a temperature of the fourth liquid phase.

12. The method according to claim 11,
wherein the electrochemical reactor further comprises at least one selected from the group consisting of cooler and heater, the cooler being configured to cool the first liquid phase or an electrolytic solution applied to the recovery device, and the heater being configured to heat the fourth liquid phase.

13. The method according to claim 1, wherein the electrochemical reactor further comprises a controller to control a ratio of a contact area between the second liquid and the first electrode to a contact area between the first liquid and the first electrode.

14. The method according to claim 1, wherein the second liquid phase is layered on the first liquid phase.

* * * * *